(12) United States Patent
Haddadi

(10) Patent No.: US 8,215,772 B2
(45) Date of Patent: Jul. 10, 2012

(54) METHOD OF ACQUIRING OF AT LEAST A PORTION OF THE SHAPE OF A SECTION OF A SPECTACLE FRAME CIRCLE

(75) Inventor: Ahmed Haddadi, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 897 days.

(21) Appl. No.: 12/297,923

(22) PCT Filed: Apr. 24, 2007

(86) PCT No.: PCT/FR2007/000694
§ 371 (c)(1),
(2), (4) Date: Oct. 21, 2008

(87) PCT Pub. No.: WO2007/128902
PCT Pub. Date: Nov. 15, 2007

(65) Prior Publication Data
US 2009/0140036 A1 Jun. 4, 2009

(30) Foreign Application Priority Data
May 5, 2006 (FR) .................................... 06 04025

(51) Int. Cl.
*G02C 13/00* (2006.01)
(52) U.S. Cl. ....................................................... 351/178
(58) Field of Classification Search .................. 351/178
See application file for complete search history.

(56) References Cited

U.S. PATENT DOCUMENTS

| 5,926,247 A * | 7/1999 | Kimura ........................... 351/41 |
| 6,142,628 A * | 11/2000 | Saigo ............................. 351/204 |
| 6,183,081 B1 * | 2/2001 | Ono et al. ..................... 351/124 |
| 2001/0001246 A1 * | 5/2001 | Ono et al. ..................... 351/124 |

FOREIGN PATENT DOCUMENTS

| DE | 19804542 | 8/1999 |
| EP | 0819967 | 1/1998 |
| EP | 0851265 | 7/1998 |
| EP | 1092502 | 4/2001 |

OTHER PUBLICATIONS

International search report in corresponding PCT/FR2007/000694, Sep. 17, 2007 mailed by EPO.

\* cited by examiner

*Primary Examiner* — James Greece
(74) *Attorney, Agent, or Firm* — Young & Thompson

(57) ABSTRACT

The method includes acquiring at least one geometrical characteristic of the section, which includes: a step of reading from a register (201) in which each entry is associated with an eyeglass frame model or category of models and includes at least one geometrical characteristic of at least one section of a rim of frames of the model or the category of models of frame, with a search for an entry corresponding to the model or to the category of eyeglass frame models to which the selected eyeglass frame belongs; and a step of reading the at least one geometrical characteristic from the corresponding entry, if a corresponding entry is found in the register.

12 Claims, 3 Drawing Sheets

METHOD OF ACQUIRING OF AT LEAST A PORTION OF THE SHAPE OF A SECTION OF A SPECTACLE FRAME CIRCLE

TECHNICAL FIELD TO WHICH THE INVENTION RELATES

The present invention relates in general to the field of eyeglasses and more precisely to acquiring the shape of a rim of an eyeglass frame of the rimmed type.

The invention relates more particularly to a method of acquiring the shape of at least a portion of a section of a rim of an eyeglass frame selected by a future wearer, the method including acquiring at least one geometrical characteristic of said section.

TECHNOLOGICAL BACKGROUND

The technical portion of the profession of an optician consists in mounting a pair of ophthalmic lenses in a frame selected by a wearer. This mounting comprises three main operations:

acquiring the shape of the bezel of each of the two rims of the eyeglass frame selected by the future wearer, i.e. the shapes of the longitudinal strands of the bezels corresponding generally to the bottoms of the grooves running along the insides of the rims of the frame, and possibly also acquiring the sections of the bezels;

centering each lens, which consists in determining the position that is to be occupied by each lens in the frame so as to be appropriately centered facing the pupil of the eye of the wearer so that the lens acts appropriately in performing the optical function for which it was designed; and shaping each lens, which consists in machining or cutting away its outline to the desired shape, taking account of the defined centering parameters and, at the end of machining, beveling which consists in making a bevel on the edge face of the lens for the purpose of holding the lens in the bezel included in the frame.

In the context of the present invention, attention is given in particular to the first operation of acquiring the shape of the bezel in the rims of the selected eyeglass frame.

In practice, the optician begins by feeling the inner outline of each of the two rims of the selected eyeglass frame so as to determine accurately the coordinates of a plurality of points characterizing the shape of the main strand of the bezel of each rim. Knowing the shape of this strand enables the optician to deduce the shape that needs to be presented by the outline of the corresponding lens, after it has been shaped and beveled, so as to enable it to be inserted in the corresponding rim of the frame.

The purpose of this operation is in particular to trace very exactly the bottom of the bezel in the rim being read, so as to enable an accurate digital image to be stored representing the shape of the longitudinal strand of the bezel.

To improve the accuracy with which the lens engages in the corresponding rim of the frame, and as explained in French patent application FR 05/12457 and European patent EP 0 819 967 in the name of the Applicant, it is possible to proceed with another operation of using feeling to acquire the shape of a section of the bezel, so as to be able to determine the way in which the bevel of the ophthalmic lens will engage in the bezel. Acquiring the shape of a section of the bezel serves in particular to calculate the depth to which the bevel of the ophthalmic lens penetrates in the bezel of the eyeglass frame so as to machine the outline of the lens with greater accuracy, taking account of this penetration depth.

Generally, all of the sections of any one bezel present identical geometries; nevertheless, the optician may acquire the shape of a plurality of sections of the bezel in order to take account of the angle of inclination of the bezel due to the curvature of the frame.

The main drawback of performing such an operation of reading sections of the bezel is that it is time-consuming for the optician to implement, in particular when it is necessary to read a plurality of sections in a single bezel.

Another purpose of that operation of acquiring the shapes of bezels in the rims of the selected eyeglass frame is to determine the optimum axial positions for the lenses relative to the front and rear edges of the rims, so that the mounting of the lenses in the frame is of pleasing appearance. For reasons of appearance, provision is generally made to position the front faces of the lenses flush with the front edges of the rims. In practice, this positioning is performed by acquiring the position of the bottom of the bezel relative to the front and/or rear edges of the rims of the frame, at at least one point for each rim.

Nevertheless, for this purpose likewise, this operation is time-consuming to implement.

OBJECT OF THE INVENTION

In order specifically to remedy the above-mentioned drawback in the state of the art, the invention proposes a method of acquiring the shape of a section of a rim of a selected eyeglass frame, the method comprising acquiring at least one geometrical characteristic with:

a step of reading a register in which each entry is associated with an eyeglass frame model or category of models and includes at least one geometrical characteristic of at least one section of a frame rim of said model or said category of models, with a search for an entry corresponding to the eyeglass frame model or category of models to which the selected eyeglass frame belongs; and a step of reading said at least one geometrical characteristic from said corresponding entry, if a corresponding entry is found in the register.

Thus, by means of the invention, when the selected eyeglass frame corresponds to an eyeglass frame model or category of models included in the register, the step of feeling the section of the bezel is avoided and replaced by a very fast step of reading the register for at least one geometrical characteristic of the section of the bezel. This simple reading step then makes it possible to decide how the bevel of the ophthalmic lens is to engage in the bezel of the selected eyeglass frame. That makes it possible to machine the edge face of the lens accordingly. The reading step may serve in particular to recover the distance between the bottom of the bezel and the front face of the frame at at least one point on each rim. In this way, the bevel may be positioned on the edge face of the lens so that, once the lens has been mounted in its rim, the front and/or rear edge of the lens is situated at a predetermined distance from the front edge of the rim.

In a first embodiment, the register may include entries associated with each defined model of frame. In a variant, the register may comprise entries, each associated with a referenced category of eyeglass frame models. It is then not always necessary for the model of the selected eyeglass frame to be already known; if the category to which the model of the selected frame belongs is included, determining that category can suffice to make it possible to acquire the geometrical characteristics of the section of the bezel. Several eyeglass frame models manufactured by the same manufacturer can present bezels with sections of identical geometry, so there is no need to determine the shape of the section of the bezel in each model of frame in the category.

According to a first advantageous characteristic of the invention, the step of reading the register is preceded by a step of determining an identifier of an eyeglass frame model or category of models to which the selected eyeglass frame belongs, with each entry of said register including at least one identifier of the model or category of models with which it is associated, and the search for a corresponding entry is performed by searching for an entry in which the identifier corresponds to the determined identifier of the eyeglass frame model or category of models to which the selected eyeglass frame belongs.

This facilitates searching for the category of the selected frame.

Preferably, if no corresponding entry is found in the register, a step is performed of feeling, with or without contact, at least one section of the bezel of the rim of the selected eyeglass frame, and the looked-for section geometrical characteristic is deduced therefrom.

The register used may either be incorporated in the tracer appliance that feels the rims of the selected frame, or else it may be constituted by a central register belonging to a computer server that can be consulted by a plurality of opticians. It is also possible to envisage a combination of these two solutions.

If the register is incorporated, it is added to by the optician on each occasion the optician traces the section of a bezel of a category of frame model that the register does not already have in its memory, thereby avoiding any need for the optician to trace several times over the sections of eyeglass frame bezels belonging to a single category of model.

According to an advantageous characteristic of the invention, the step of determining the identifier of the eyeglass frame model or category of models to which the selected eyeglass frame belongs is performed, by an operator reading an identification code of the selected eyeglass frame.

Thus, the optician can read the identifier of the model or the category of models of the selected frame and then either search in a register in paper format for the characteristics for the shape of the looked-for bezel section, or else enter the identifier, e.g. via a keypad connected to a computer device, so that the computer device can launch a search for a corresponding entry.

In a variant, the step of determining the identifier of the eyeglass frame model or category of models to which the selected eyeglass frame belongs is performed by reading identification means fitted to the selected eyeglass frame. In this variant, the identification means of the selected eyeglass frame advantageously comprises a transponder or a bar code.

The appliance used for reading the shape of the longitudinal strand can then automatically read a bar code on a label secured to the frame in order to proceed quickly and automatically with searching for the corresponding entry, thereby avoiding any need for the optician to perform additional work when implementing the acquisition method of the invention. The shape tracer appliance may also receive waves coming from the transponder secured to the frame, and then process them in order to determine automatically the identifier of the model or the category of models to which the selected eyeglass frame belongs.

In another variant of the acquisition method, the shape of a longitudinal strand of a bezel of the rim of the selected eyeglass frame is acquired and said identifier of the model or the category of models of the selected frame is deduced therefrom.

The identifier of each frame can thus be generated quickly from the data that is normally acquired by the optician when tracing the shape of the outline of a bezel, without the need for any additional operation. By way of example, the identifier may be constituted by the geometrical coordinates of certain characteristic points of the shape of the longitudinal strand of the bezel.

The determined identifier is then advantageously a data set characterizing or representing the shape of the longitudinal strand of the bezel of the selected eyeglass frame, and the identifier of each entry in the register is a data set characterizing or representing the shape of the longitudinal strand of the bezel of the model or category of model associated with the entry.

Advantageously, each entry in the register is associated with a single eyeglass frame model.

Thus the shapes of the sections of the bezels of frame models included in the register, and in particular their angles of inclination, can be entered in the register with increased accuracy.

Advantageously, said at least one geometrical characteristic for the section of the rim comprises a geometrical characteristic relating to the shape of a bezel of the rim and/or to a distance between the bottom of a bezel of said rim and an edge of said rim.

DETAILED DESCRIPTION OF AN EMBODIMENT

The following description given as a non-limiting example with reference to the accompanying drawings explains what the invention consists in and how it can be reduced to practice.

To implement the method of the invention, it is necessary to have a shape tracer appliance. Such a shape tracer appliance is well known to the person skilled in the art and does not itself constitute the subject matter of the invention described. For example, it is possible to use a shape tracer appliance as described in patent EP 0 750 172 or as sold by Essilor International under the trademark Kappa or the trademark Kappa CT.

Figure 1:
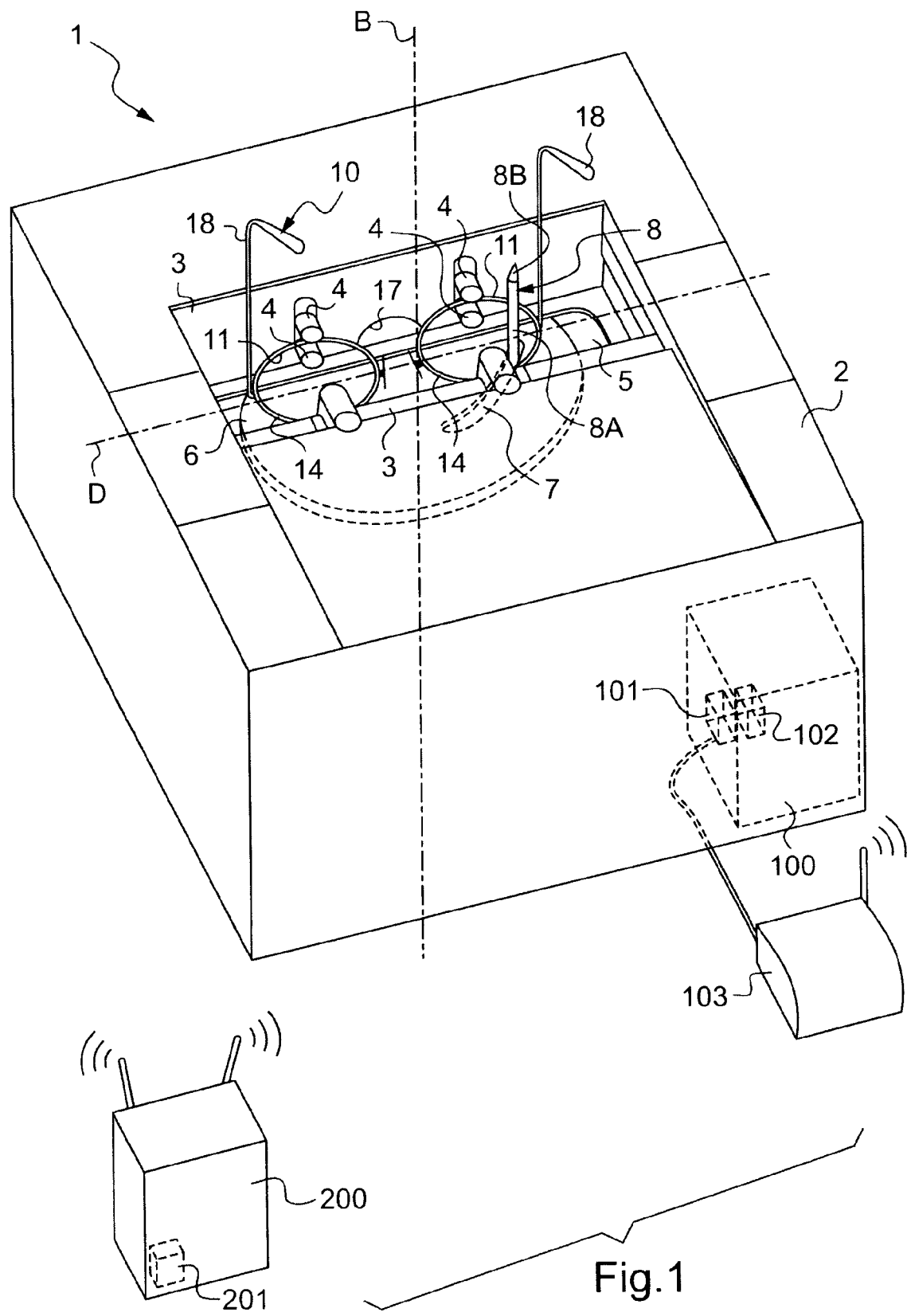
FIG. 1 is a diagrammatic perspective view of a shape tracer appliance of the invention receiving an eyeglass frame.

FIG. 1 is a general view of the shape tracer appliance 1, as seen by its user. This appliance includes a top cover 2 covering the entire appliance with the exception of a central top portion.

The shape tracer appliance 1 is for tracing the shapes of the bezels 11 of an eyeglass frame selected by a wearer.

Figure 6:
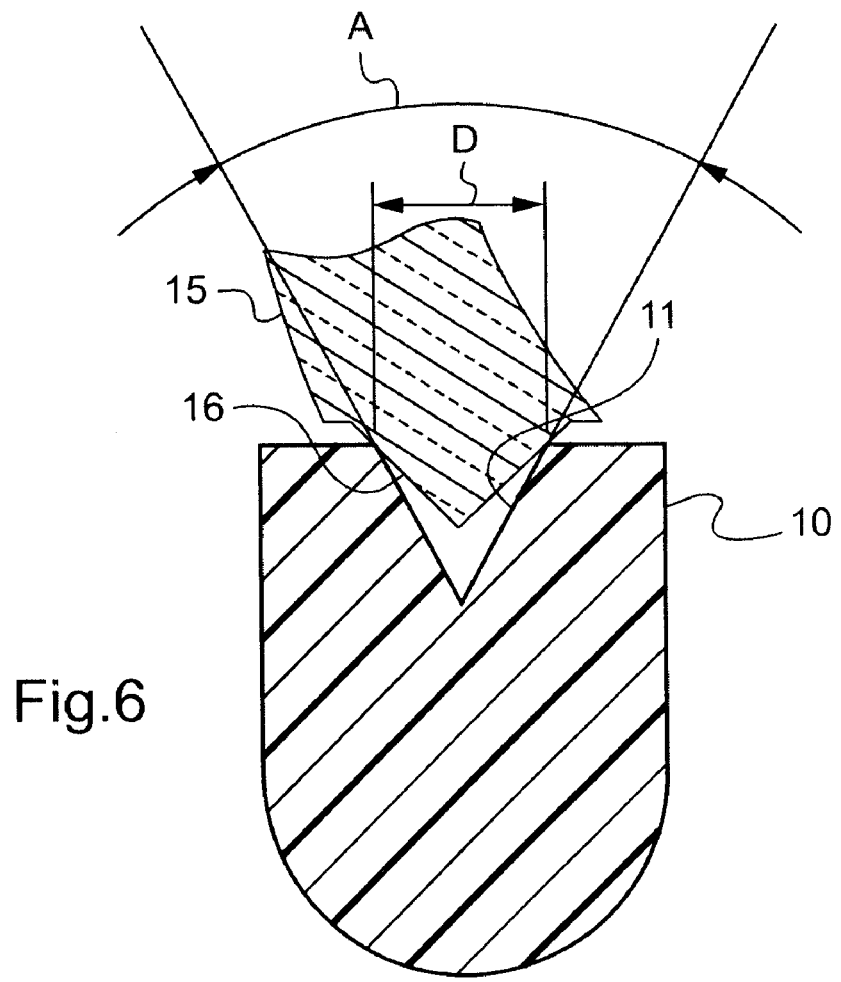
FIG. 6 is a fragmentary section view of an ophthalmic lens engaged in the bezel of one of the rims of the eyeglass frame of FIG. 1.

The selected eyeglass frame 10 is of the rimmed type in this example. As can be seen more precisely in FIGS. 1 and 2, it has two rims 14, a right rim and a left rim, for positioning respectively in register with the right eye and the left eye of the wearer when the wearer wears said frame, together with a bridge 17 interconnecting the two rims 14, and two side branches or "temples" 18, each connected to a respective one of the rims. Each of the two rims presents an inner groove commonly referred to as a bezel 11, with the bottom thereof forming a longitudinal strand. With reference to FIG. 6, each of the rims of the selected eyeglass frame 10 is adapted to receive an ophthalmic lens 15 provided on its edge face with a bevel 16 that is to engage in one of the bezels 11.

The shape tracer appliance 1 shown in FIG. 1 has a set of two jaws 3, in which at least one of the jaws 3 is movable relative to the other so that the jaws 3 can be moved towards each other or apart from each other in order to form a clamp device. Each of the jaws 3 is also provided with two holders each formed by two movable studs 4 suitable for being adapted to clamp between them the selected eyeglass frame 10 in order to prevent it from moving.

In the space left visible by the central top opening in the cover 2, there can be seen a structure 5. A plate (not visible) can move in translation on the structure 5 along a transfer axis D. This plate has a turntable 6 mounted to turn thereon. The turntable 6 is thus suitable for taking two positions on the transfer axis D, a first position in which the center of the turntable 6 is disposed between the two pairs of studs 4 holding the right rim of the selected eyeglass frame 10, and a second position in which the center of the turntable 6 is located between the two pairs of studs 4 holding the left rim of the selected eyeglass frame 10.

The turntable 6 possesses an axis of rotation B defined as being the axis normal to the front face of the turntable 6 and passing through the center thereof. It is suitable for pivoting relative to the plate. The turntable 6 also includes an oblong slot 7 in the form of an arc of a circle, through which there projects a feeler 8 comprising a support rod 8A, and its free end, a feeler stylus or finger 8B designed to slide along, or possibly to roll along, the longitudinal strand in each bezel 11 of the selected eyeglass frame 10.

The shape tracer appliance 1 includes actuator means (not shown) adapted firstly to cause the support rod 8A to slide along the slot 7 so as to move it away from or towards the center of the turntable 6, and secondly to position the feeler finger 8B of the feeler 8 at a greater or smaller altitude relative to the plane of the front face of the turntable 6.

To summarize, the feeler 8 is designed to have three degrees of freedom, including a first degree of freedom THETA constituted by the ability of the feeler 8 to pivot about the axis of rotation B by virtue of the turntable 6 turning relative to the plate, a second degree of freedom Z constituted by the ability of the feeler 8 to move in translation along an axis parallel to the axis of rotation B of the turntable 6, and a third degree of freedom R constituted by the ability of the feeler 8 to move relative to the axis of rotation B by virtue of its freedom to move along the circular arc formed by the slot 7.

Each point read by the end of the feeler finger 8B of the feeler 8 is identified in a corresponding coordinate system R, THETA, Z.

The shape reader appliance 1 also includes acquisition means 101 for acquiring the position R, THETA, Z of the end of the feeler finger 8B of the feeler 8.

It also includes driver means 102 for controlling the actuation of the appliance, for the purpose of positioning the end of the feeler finger 8B of the feeler 8.

The acquisition means 101 and the driver means 102 are incorporated within an electronic and/or computer device 100 serving firstly to actuate the actuator means of the appliance and secondly to pick up and record data transmitted thereto by sensors incorporated in the shape reader appliance 1.

The electronic and/or computer device 100 is also connected to communication means 103, wireless communication means in this example. These communication means 103 are adapted firstly to communicate with a machine for shaping lenses (not shown) in order to transmit thereto the results of the operations of reading the shapes of bezels, and secondly to communicate with a computer server 200 that is remote from the shape tracer appliance 1.

This information server 200 includes a register 201 in which each entry is associated with a referenced category of one or more eyeglass frame models. In this example, each referenced category comprises a single model of an eyeglass frame, such that entry is associated with a single eyeglass frame model.

Each entry comprises a plurality of information headings, including:
  one or more identification headings forming a primary key, containing an identifier for the eyeglass frame model;
  one or more transverse geometry headings containing geometrical characteristics of a plurality of sections of the rims (in particular of the bezel) of the frames or eyeglass of this model of frame; and
  one or more longitudinal geometry headings containing a data set representative of the geometry (shape and dimensions) of the longitudinal strands of the bezels in the eyeglass frames of this model of frame.

It is possible to provide for the identification heading to be distinct from the longitudinal geometry heading, or on the contrary to coincide therewith.

When these headings are distinct, the identification heading contains, for example, a unique identification code, such as a number or a name, a trademark or a reference, or indeed an electronic label signature (RFID, transponder, etc.).

In this example, and in contrast, the register contains a longitudinal geometry heading that acts as a key and that coincides with the identification heading, and constitutes a key for searching amongst the entries of the register, making it possible to find an entry corresponding to data concerning the longitudinal geometry of the bezel of the rim of the frame as read by the shape reader appliance. This heading contains the cylindrical or other coordinates of a set of points belonging to a remarkable longitudinal strand of the bezel, such as the strand constituting the bottom of the bezel.

In order to perform its key function, the longitudinal geometry heading may contain only approximate characteristics concerning the longitudinal geometry of the bezel of at least one of the rims of the model of frame concerned by the entry, serving to discriminate between different frame models in the register. It is not necessary for the longitudinal geometry heading to contain a complete description of the longitudinal geometry of the bezel in a form suitable for shaping a lens. The longitudinal geometry heading may thus contain the (cylindrical or other) coordinates of a set of 10 to 50 points of the bezel.

Nevertheless, it is advantageous to make provision, as in the present example, for the longitudinal geometry heading to contain more accurate data concerning the longitudinal geometry of the bezel of the model of frame in question. Such increased accuracy of the data provided in the longitudinal geometry heading has two main advantages. Firstly, it makes it easier to implement search requests and avoids the appearance of duplicates because of the increased accuracy improving the discriminating power of the data. Secondly, as explained below, it makes it possible after a successful request has been carried out on the basis of succinct data about the longitudinal geometry of the bezel to recover complete and accurate data concerning data longitudinal geometry as contained in the register and suitable for enabling a lens to be shaped. For this purpose, the longitudinal geometry heading contains the (cylindrical or other) coordinates of a set of at least 200 points of the bezel, and typically a number lying in the range 300 points to 1500 points.

Figure 3:
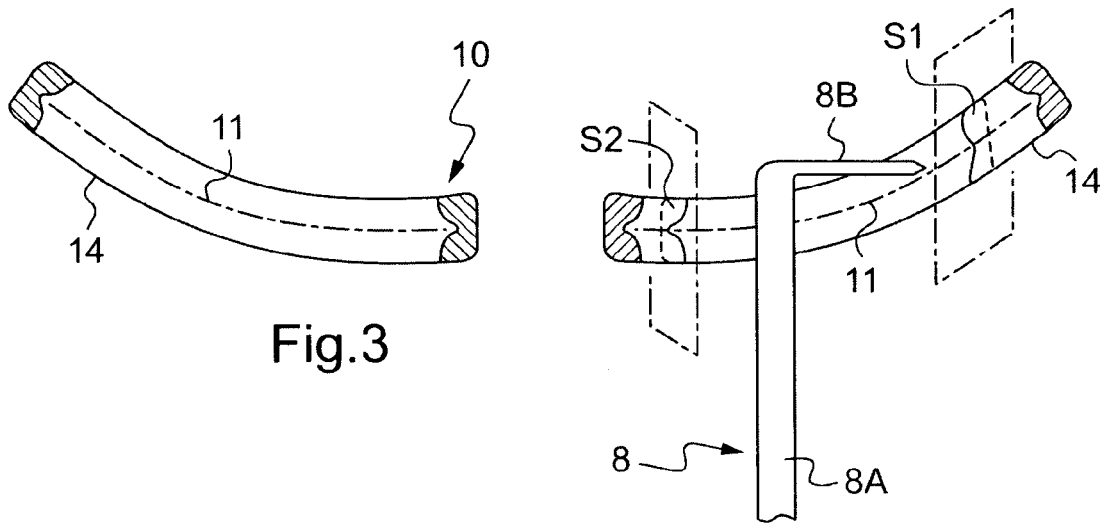
FIG. 3 is a diagrammatic section view of the rims of the FIG. 1 eyeglass frame.
Figure 4:
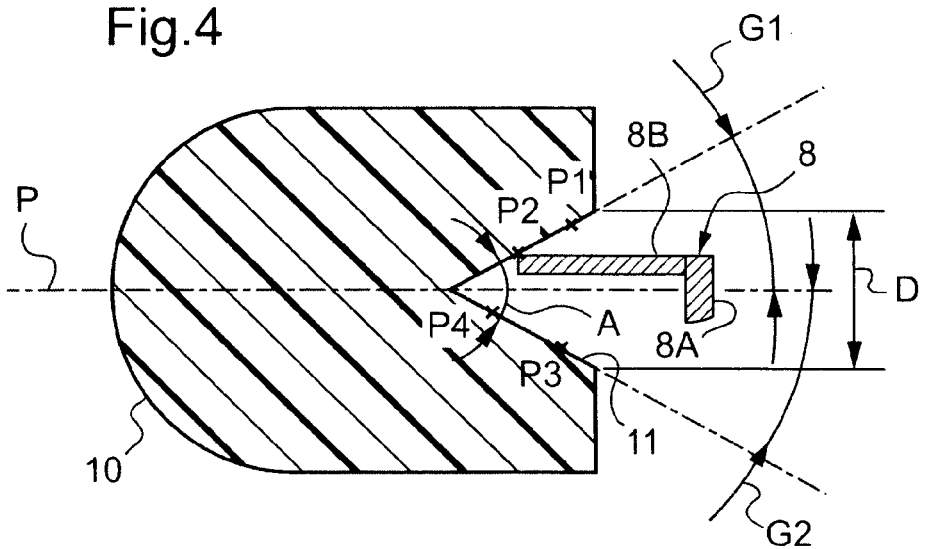
FIGS. 4 and 5 are section views of a feeler stylus of the shape tracer device of FIG. 1 in contact with the bezel of one of the rims of the FIG. 1 eyeglass frame, FIGS. 4 and 5 showing two distinct sections of the bezel.
Figure 5:
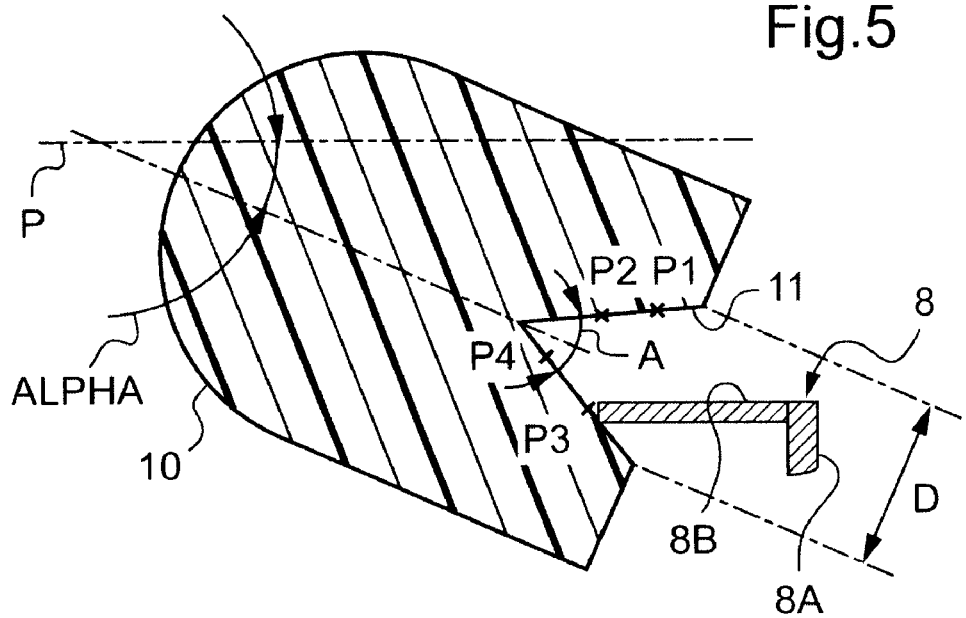

As shown more particularly in FIGS. 3 to 5, the geometrical characteristics of the transverse geometry heading(s) comprise in this example three geometrical characteristics of the section of the bezel as measured at two distinct sections S1 and S2 of the bezel 11. One of the sections is situated close to the bridge 17 of the frame, and the other close to the point where the branch 18 is attached to the frame (e.g. corresponding to angular positions THETA for the feeler 8 that are equal to 90 degrees and to 270 degrees). These geometrical characteristics are constituted by the aperture angle A of the bezel 11, by the aperture width D of the bezel 11, and by its angle of inclination ALPHA relative to a plane P parallel to the plane of the front face of the turntable 6.

These first two geometrical characteristics A and D of the bezel 11 make it possible, as can be seen more clearly in FIG. 6, to determine how the bevel 16 on the ophthalmic lens 15 that is to be shaped is going to engage in the bezel of the selected eyeglass frame 10. The third geometrical characteristic ALPHA serves to take account of the angle of inclination of the bezel due to the curvature of the frame. It is also useful for determining how the bevel 16 will engage in the bezel 11.

In a variant, it is possible to determine the geometrical characteristics at a larger plurality of sections of the bezel in order to acquire more accurately the angle of inclination of the bezel along the longitudinal strand.

The geometrical characteristics of the transverse geometry heading(s) further include a fourth geometrical characteristic relating to the position of the bottom of the bezel 11 relative to the front and/or read edge of the eyeglass frame, in an axial direction that is substantially perpendicular to the plane of the frame rim or of the lens.

This fourth geometrical characteristic makes it possible subsequently to machine the lens in such a manner that is front and/or rear faces are situated at a desired distance from the front and/or rear edges of the frame.

Once the bevel of the lens has been engaged in the bezel of the frame, the position of the top of the bevel is substantially identical with the position of the bottom of the bezel. Consequently, by measuring the distance between the bottom of the bezel and the front and/or rear edges of the frame, it is possible to position the optical front face of the lens attractively relative to the front edge of the corresponding rim of the frame using conventional control for the position of the bevel on the edge face of the lens.

In practice, this makes it possible to position the lens in the frame in such a manner that the distance between the front face of the lens and the front edge of the rim is substantially constant all around the periphery of the lens (e.g. zero). In a variant, it is possible to obtain an assembly that is balanced in that the above-mentioned distance is equal to the distance between the rear face of the lens and the rear edge of the rim.

The register 201 may also include additional headings containing additional information, such as:
  the trademark of the manufacturer of the eyeglass frame 10;
  the base of the frame (i.e., assuming that the frame extends on the surface of the cylinder, the radius of the cylinder);
  the plastic or metal material from which the frame is made;
  the color of the frame;
  the pantoscopic angle of the frame (i.e. the angle formed between the mean plane of the rims of the frame and the plane that is orthogonal to the branches of the frame when they are deployed);
  the distance between the two rims of the frame;
  information relating to decorative elements associated with the lenses, for example shapes and positions relative to the frame of patterns that are to be etched in the lenses; and
  information relating to the positions and the dimensions of holes drilled in the lenses for mounting in rimless frames.

In service, the optician needs to acquire the data about the shape of a bezel of a selected frame 10 that is sufficient to enable a lens for mounting in the frame in question to be shaped accurately. For this purpose, the optician begins by quickly acquiring the longitudinal geometry of the bezel of the frame.

To do this, the longitudinal strand is considered discretely as a certain number of points at which it is desired to measure the three-dimensional coordinates corresponding to the coordinates R, THETA, and Z of the end of the feeler 8 when it is in contact with said points.

With reference to FIG. 1, before beginning an operation of feeling the bezel 11 of each rim 14 of the selected eyeglass frame 10, the frame is inserted between the studs 4 of the jaws 3 so that each of the rims of the frame is ready for feeling along a path that begins by inserting the feeler 8 between the two studs 4 corresponding to the bottom portion of the frame, and then running along the bezel of the frame so as to cover the entire circumference of the rim 14 of the selected eyeglass frame 10.

FIG. 3 shows the top end of the feeler 8, and in particular its feeler finger 8B. This finger has a pointed end that is inserted into the bezel 11 of one of the rims 14 of the frame 10 in order to trace the shape of its longitudinal strand. In an initial position, when the feeler finger 8B is placed between the two studs 4, the acquisition means 101 define as zero the angular position THETA, the altitude Z, and the radial coordinate R of the end of the feeler 8. Thereafter, the turntable 6 begins to turn at a constant speed. The feeler 8 moves along the bottom of the bezel 11 and is guided along its radial coordinate R and along its altitude Z by the bezel 11.

Contact is maintained between the feeler finger 8B and the bottom of the bezel 11 by the actuator means. These means exert an overall return force on the feeler 8 that enables the feeler finger 8B to remain in contact with the bottom of the bezel 11. The pickups of the shape reader appliance 1 act during the turning of the turntable 6 to pick up the three-dimensional coordinates of points along the longitudinal strands of the bottom of the bezel 11. The appliance can thus store a digital image of each of the two longitudinal strands of the bottoms of the bezels 11 of the rims 14 of the selected eyeglass frame 10.

After this operation of feeling the shape of the longitudinal strand of each of the bezels 11 of the rims 14 of the selected eyeglass frame 10, the electronic and/or computer device 100 proceeds with a step of determining an identifier for the model of the selected eyeglass frame.

To do this, the device generates a data set that is characteristic of the shape as acquired of the longitudinal strand. This data set obtained from the acquired shape of the bezel constitutes the identifier of the frame. By way of example, this identifier is made up of the three-dimensional coordinates (e.g. expressed in cylindrical coordinates: angle THETA; radius R; and altitude Z) corresponding to a plurality of points distributed along the longitudinal strand in substantially regular manner around the bezel. For example, it is possible to use a set of 10 to 50 points, and advantageously about 30 points.

Once the identifier has been determined in this way, the electronic and/or computer device 100 communicates the identifier to the computer server 200 via its communication means 103.

A search is made amongst the records in the register 201 of the computer server 200 in order to find a corresponding record having an identifier that corresponds to the identifier of the selected eyeglass frame 10. For this purpose, the electronic and/or computer device 100 searches through the longitudinal geometry heading(s) that in this example constitute the identification heading or key, as explained above. The search may be performed, for example, by the electronic and/or computer device 100 as follows.

The data representative of the geometry of the longitudinal strand of the bottom of the bezel as measured on the selected frame 10 (below the "measured strand") is stored by the electronic and/or computer device 100, which compares said data in succession with the data in the longitudinal geometry heading(s) relating to the geometry of the longitudinal strand at the bottom of the bezel in each of the models of frame in the register (hereinafter "registered strands").

For each entry, the electronic and/or computer device 100 establishes a virtual correspondence between the registered strand and a measured strand by implementing an algorithm for superposing the two strands.

The registered strand is defined by a set of N points of coordinates that are known in a defined frame of reference. Similarly, when the shape tracer appliance 1 acquires the measured strand, a set of M points is defined for said strand. The coordinates of these M points are then known in the defined frame of reference. The electronic and/or computer device 100 calculates the distances between the various points of the measured and registered strands. In order to superpose these two strands "virtually", it determines the transformation that would enable said superposition to be performed. Then, by way of example, it applies this transformation to the registered strand and obtains a transformed registered strand defined by the N transfer points of the registered strand.

Thereafter, it counts the number Nsup of points amongst the N points of the registered strand that are situated in a close vicinity to a point of the measured strand. A "close vicinity" is used to mean that the two points in question are situated at a distance apart from each other that is less than some given distance, e.g. a few tenths of a millimeter. Each point of the transformed registered strand that is situated in a close vicinity of one of the M points of the measured strand is considered as being superposed on said point.

If the number Nsup of points of the transformed registered strand as superposed in this way is greater than 90% of the number N, it is considered that the transformation is appropriate and thus that the measured and registered strands are superposed. However, if the number Nsup is less than or equal to 90%, then the parameters of the transformation are varied within a range of determined values while using an increment that is sufficiently small, until a combination of these values provides a number Nsup of points that is greater than 90% of the number N or until the end of the register has been reached without any registered strand being superposed on the measured strand.

The threshold value of 90% can be modified depending on the desired accuracy, as can the given distance defining close vicinity between two points. The two strands may be put into correspondence by using a limited number of points that is greater or smaller.

If no registered strand is found amongst the various entries, then the electronic and/or computer device 100 deduces that the model to which the selected frame 10 belongs is absent from the register.

If a registered strand in one of the entries in the register is found, then this entry is retained as corresponding to the model to which the selected frame 10 belongs. The electronic and/or computer device 100 reads from the entry found in the register the longitudinal geometry data (coordinates of at least 200 points of the longitudinal strand) for the bezel of the frame model that corresponds to this entry and thus to which the selected frame 10 belongs. The optician is thus spared from reading the longitudinal strand of the bezel accurately, and therefore saves time.

The electronic and/or computer device 100 also reads from the entry it has found in the register the geometrical characteristics A, D, and ALPHA of the sections S1 and S2 of the bezel 11 as contained in the transverse geometry heading(s), together with the axial distance between the bezel and the front and/or rear edge of the rim of the frame, from the corresponding entry.

This longitudinal and transverse geometrical data is transmitted via the communication means 103 from the shape tracer appliance 1 to the shaper machine so that the shaper machine can calculate the shape to be given to the ophthalmic lenses 15 so that their bevels 16 engage properly and pleasingly in the rims 14 of the selected eyeglass frame 10.

In contrast, if the search is inconclusive and no corresponding entry is found in the register, the electronic and/or computer device 100 displays a message informing the operator that it is necessary to perform an accurate and complete measurement of each of the rims of the selected frame 10 in order to obtain the geometry data needed for shaping a lens that is to be mounted in the selected frame 10. If the operator confirms this message, or in the event of the operator failing to give any response, if a predetermined period has elapsed, the software starts a step of measuring the longitudinal strand at the bottom of the bezel accurately (over at least 200 points) and a step of feeling the sections S1 and S2 of the bezel 11 of the selected eyeglass frame 10 in order to determine the geometrical characteristics, A, D, and ALPHA of those two sections of the bezel 11, and also of the front and/or rear edge of the rim of the frame at each of said sections. These geometrical characteristics are then transferred to the shaper device for generating the machining setpoints.

In order to trace the section of the rim of the frame, and in particular of the bezel, as shown in FIGS. 4 and 5, the driver means 102 controlling the feeler 8 place the feeler finger 8B against the bezel 11 in such a manner that the angular position of its end is equal to 90 degrees—the feeler 8 is thus in position to feel the first section S1 of the bezel 11—and then the actuator means move the feeler in translation so that it slides from one side to the other of the bezel 11, along each of its flanks and over each of its edges. During this sliding, the acquisition mans 101 of the electronic and computer device 100 measure the width D of the opening of the bezel 11 (generally lying in the range 1 millimeter (mm) to 2.5 mm) and the three-dimensional coordinates of distinct points P1, P2, P3, P4 on each of the two flanks of the bezel 11 so as to deduce the slopes G1 and G2 of these two flanks. The aperture angle A of the bezel 11 is then calculated by summing the values for the slopes G1 and G2, and the angle of inclination ALPHA of the bezel 11 is also calculated. Said means also calculate the distance between the bottom of the bezel and each of the front and rear edges of the rim. The driver means 102 then move the feeler 8 into a second position in which it comes into contact with the bezel 11 and in which its angular position is equal to 270 degrees. The electronic and/or computer device 100 acts in the same manner to deduce the width D of the opening, the aperture angle A, and the angle of inclination ALPHA at the second section S2 of the bezel 11.

The communication means 103 can then send the geometrical characteristics A, D, and ALPHA of the sections S1 and S2 of the bezel 11 together with the distances between the bezel and the front and/or rear edges of the rim of the frame 10, together with the coordinates of the points felt on the longitudinal strand of the bezel to the shaper machine so that it can calculate the shape to be imparted to the ophthalmic lenses 15 so that their respective bevels 16 can engage properly in the rims 14 of the selected eyeglass frame 10.

In a variant embodiment of the invention, when the search for a corresponding entry appears to be successful, a confirmation step can be performed to ensure that the selected frame 10 does indeed correspond to the entry that has been found in the register 201. This step consists in correlating all of the coordinates of the 360 points measured along the longitudinal strand of the bezel 11 with all of the data representative of the shape of the longitudinal strand in the entry that has been found. If this correlation provides a positive result indicating that the shape of the longitudinal strand as felt does indeed correspond to the shape of the longitudinal strand in the entry that has been found, then the computer server 200 sends all of the geometrical characteristics A, D, and ALPHA of said entry that has been found to the shape tracer appliance 1. Otherwise it is necessary to proceed with tracing the sections S1, S2 of the bezel 11.

In another embodiment, the step of determining the identifier of the model of the selected eyeglass frame 10 is performed by the optician reading identification means of the selected eyeglass frame. By way of example, these identification means may be constituted by an identification code marked on a label secured to the frame. Once the optician has read the identification code, it is input into the shape tracer appliance, e.g. using a keypad connected to the electronic and/or computer device 100 so as to enable it to start a search for the corresponding entry.

Figure 2:
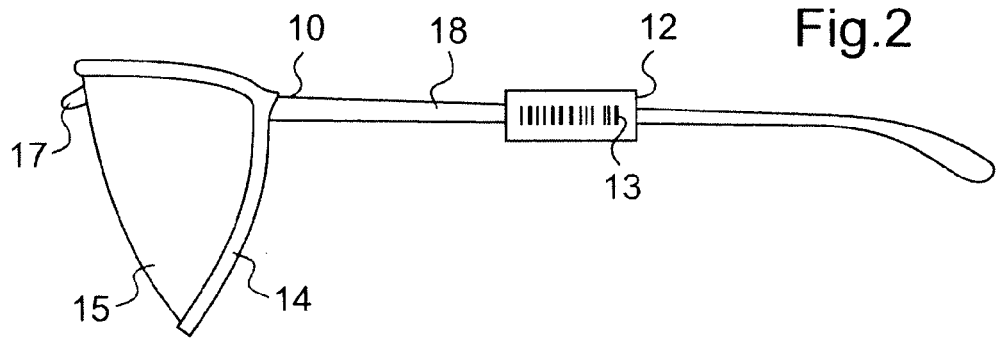
FIG. 2 is a diagrammatic side view of the FIG. 1 eyeglass frame.

In another embodiment shown in FIG. 2, the shape tracer appliance 1 includes optical reader means (not shown) for reading a bar code 13 carried by an identification plate 12 fitted on one of the branches 18 of the selected eyeglass frame 10. The bar code 13 constitutes the identifier of the model of the frame.

Thus, the shape tracer appliance 1 can automatically read the bar code 13 while the frame is installed in the appliance, so as to proceed quickly and automatically with finding the corresponding entry in the register 201, thus avoiding any extra work on the part of the optician in implementing the shape acquisition method of the invention.

In a variant of this embodiment, the shape tracer appliance 1 includes a read antenna and the frame may be fitted with respective electronic labels of the transponder radio frequency identifier (RFID) type. The information conveyed by the signal delivered by the transponder then constitutes the identifier of the model of the eyeglass frame.

In another embodiment of the invention, a search can be performed manually for a corresponding entry amongst the entries in the register. The shape tracer appliance 1 then includes a man/machine interface such as a touch screen.

In this embodiment, after reading the shape of the outline of the bezel of the eyeglass frame installed in the shape tracer appliance, the appliance communicates with the operator, proposing associating a bezel section with said frame. In this context, various icons representing various types of bezel section can be displayed on the touch screen. The operator, merely by looking at the bezel of the eyeglass frame (or possibly after making a few manual measurements of the section of the bezel), then manually selects one of the icons so that the shape tracer appliance associates the selected bezel section with said frame.

Thereafter, the shaper machine can calculate the shape to be imparted to the ophthalmic lenses for mounting on said frame in such a manner as to ensure that their respective bevels can engage properly in the rims of the frame.

In a variant, each icon may comprise a trademark and/or a frame name so as to make it easy for the operator to select from the register the entry corresponding to the eyeglass frame installed in the shape tracer appliance.

The invention claimed is:

1. A method of acquiring the shape of at least a portion of a section of a rim (14) of a selected eyeglass frame (10) of a rimmed type, the method comprising:
    acquiring via one of an electronic and a computer device (100) of a shape tracer appliance (1), at least one geometrical characteristic (A, D, ALPHA) of said section, the step of acquiring said at least one geometrical characteristic (A, D, ALPHA) comprises:
        a step of reading a register (201) of a computer server in which each entry is associated with an eyeglass frame model or category of models and includes at least one geometrical characteristic (A, D, ALPHA) of at least one section of a frame rim of said model or said category of models, with a search for an entry corresponding to the eyeglass frame model or category of models to which the selected eyeglass frame (10) belongs; and
        a step of reading said at least one geometrical characteristic (A, D, ALPHA) from said corresponding entry, upon a corresponding entry being found in the register (201) of the computer server.

2. The method according to claim 1, in which the step of reading the register (201) is preceded by a step of determining an identifier (13) of an eyeglass frame model or category of models to which the selected eyeglass frame (10) belongs, with each entry of said register (201) including at least one identifier (13) of the model or category of models with which it is associated, and the search for a corresponding entry is performed by searching for an entry in which the identifier (13) corresponds to the determined identifier of the eyeglass frame model or category of models to which the selected eyeglass frame (10) belongs.

3. The method according to claim 1, wherein upon no corresponding entry being found in the register (201), a step is performed of scanning at least one section of the bezel (11) of the rim (14) of the selected eyeglass frame (10), and the looked-for section geometrical characteristic is deduced therefrom.

4. The method according to claim 2, wherein the step of determining the identifier (13) of the eyeglass frame model or category of models to which the selected eyeglass frame (10) belongs is performed by reading identification means (12) fitted to the selected eyeglass frame (10).

5. The method according to claim 4, wherein the identification means (12) of the selected eyeglass frame (10) comprise a transponder or a bar code (13).

6. The method according to claim 2, wherein the one of the electronic and the computer device (100) of a shape tracer appliance (1) is adapted to receive the identifier (13) of one of the eyeglass frame model and category of models to which the selected eyeglass frame (10) belongs from an operator reading an identification code (13) of the selected eyeglass frame (10).

7. The method according to claim 2, wherein the shape of a longitudinal strand of a bezel (11) of the rim (14) of the selected eyeglass frame (10) is acquired by the shape tracer appliance (1) and said identifier of the model or the category of models of the selected frame is deduced therefrom.

8. The method according to claim 7, wherein the determined identifier is a data set one of characterizing and representing the shape of the longitudinal strand of the bezel (11) of the selected eyeglass frame (10), and the identifier of each entry in the register (201) is a data set characterizing or representing the shape of the longitudinal strand of the bezel of one of the model and category of models associated with the entry.

9. The method according to claim 1, in which each entry in the register (201) is associated with a single eyeglass frame model.

10. The method according to claim 2, wherein upon no corresponding entry being found in the register (201), a step is performed of scanning at least one section of the bezel (11) of the rim (14) of the selected eyeglass frame (10), and the looked-for section geometrical characteristic is deduced therefrom.

11. The method according to claim 2, wherein each entry in the register (201) is associated with a single eyeglass frame model.

12. A method of determining one of an eyeglass model and category of eyeglass models from a rimmed eyeglass frame, comprising:

acquiring, via a computer from a shape tracer appliance, at least one geometrical characteristic of a section of the rimmed eyeglass frame;

requesting, via the computer from a server, records corresponding to the at least one geometrical characteristic;

searching, via the computer, each record of the requested records by increasing a counter corresponding to each record, upon each point of geometrical characteristics stored in each record matching a point of the geometrical characteristics of the rimmed eyeglass frame;

determining, via computer, a match of the one of the eyeglass model and the category of eyeglass models from the counter corresponding to each record with the largest value and the counter with the largest value having a value greater than a predetermined threshold; and transmitting, via the computer, the record identifying the one of the eyeglass model and the category of eyeglass models for cutting a lens of the rimmed eyeglass frame.

* * * * *

UNITED STATES PATENT AND TRADEMARK OFFICE
CERTIFICATE OF CORRECTION

PATENT NO. : 8,215,772 B2
APPLICATION NO. : 12/297923
DATED : July 10, 2012
INVENTOR(S) : Ahmed Haddadi It is certified that error appears in the above-identified patent and that said Letters Patent is hereby corrected as shown below:

On the title page, please amend Item (73) to read as follows:

--(73) Assignee: Essilor International (Compagnie Generale d'Optique),

Charenton-le-Pont, (FR)--

Signed and Sealed this
Twenty-eighth Day of August, 2012

David J. Kappos
*Director of the United States Patent and Trademark Office*